(12) United States Patent
Emo et al.

(10) Patent No.: US 7,023,645 B1
(45) Date of Patent: Apr. 4, 2006

(54) READ ERROR RECOVERY METHOD AND APPARATUS

(75) Inventors: Bruce Emo, Longmont, CO (US); Quinn Haddock, Longmont, CO (US)

(73) Assignee: Maxtor Corporation, Longmont, CO (US)

(*) Notice: Subject to any disclaimer, the term of this patent is extended or adjusted under 35 U.S.C. 154(b) by 57 days.

(21) Appl. No.: 10/430,366

(22) Filed: May 5, 2003

Related U.S. Application Data

(60) Provisional application No. 60/377,881, filed on May 3, 2002.

(51) Int. Cl.
*G11B 21/02* (2006.01)

(52) U.S. Cl. .............................. 360/75; 360/31; 360/71

(58) Field of Classification Search ................. 360/75, 360/25, 53, 31, 234.7
See application file for complete search history.

(56) References Cited

U.S. PATENT DOCUMENTS

| | | | | |
|---|---|---|---|---|
| 5,210,669 | A | 5/1993 | Weispfenning et al. ...... 360/124 |
| 5,303,107 | A | 4/1994 | Miura et al. ................. 360/137 |
| 5,416,652 | A | 5/1995 | Lewis ........................... 360/48 |
| 5,519,546 | A | 5/1996 | Lewis ........................... 360/48 |
| 5,541,784 | A | 7/1996 | Cribbs et al. ................. 360/75 |
| 5,754,355 | A | * | 5/1998 | Nakamura et al. ........ 360/73.03 |
| 5,760,990 | A | 6/1998 | Ukani et al. .............. 360/77.04 |
| 5,870,241 | A | 2/1999 | Ottesen et al. ............ 360/77.02 |
| 5,877,919 | A | 3/1999 | Foisy et al. ................. 360/104 |
| 5,880,899 | A | * | 3/1999 | Blachek et al. ................ 360/66 |
| 5,909,661 | A | 6/1999 | Abramovitch et al. ....... 702/191 |
| 5,956,200 | A | * | 9/1999 | Kohno et al. ............. 360/77.04 |
| 5,959,801 | A | 9/1999 | Gillis et al. .................... 360/75 |
| 5,991,113 | A | * | 11/1999 | Meyer et al. .................. 360/75 |
| 6,052,804 | A | * | 4/2000 | Thowe et al. ................ 714/710 |
| 6,195,219 | B1 | 2/2001 | Smith ........................... 360/66 |
| 6,307,719 | B1 | 10/2001 | Mallary .................... 360/294.7 |
| 6,369,974 | B1 | 4/2002 | Asgari et al. ............. 360/78.14 |
| 6,381,094 | B1 | 4/2002 | Gill ............................ 360/126 |
| 6,452,735 | B1 | * | 9/2002 | Egan et al. .................... 360/31 |
| 6,597,530 | B1 | 7/2003 | Asano et al. ............. 360/78.14 |
| 6,614,624 | B1 | 9/2003 | Shiraishi et al. .......... 360/245.9 |
| 6,671,111 | B1 | 12/2003 | Ottesen et al. ................ 360/31 |
| 6,687,083 | B1 | 2/2004 | Hsiao et al. ................. 360/126 |
| 6,714,371 | B1 | 3/2004 | Codilian ....................... 360/60 |
| 6,717,763 | B1 | 4/2004 | Ottesen et al. ................ 360/75 |
| 6,754,050 | B1 | 6/2004 | Kong et al. .................. 360/317 |
| 6,760,174 | B1 | * | 7/2004 | Forehand ...................... 360/53 |
| 6,760,191 | B1 | 7/2004 | Yan et al. .................... 360/128 |

OTHER PUBLICATIONS

U.S. Appl. No. 10/337,912, filed Jan. 6, 2003, Darragh et al.
U.S. Appl. No. 10/338,046, filed Jan. 6, 2003, Emo.

* cited by examiner

*Primary Examiner*—K. Wong
(74) *Attorney, Agent, or Firm*—Tejpal S. Hansra

(57) ABSTRACT

The present invention provides a method and apparatus for recovering data in a disk drive following a read error. At least a portion of the actuator arm tip is heated. Thermal expansion reduces the read-head-to-disk spacing, increasing the likelihood of success when a re-read of the data is attempted. In one approach, a heater is operatively coupled to the tip. In one aspect, a write head is provided with write current in order to heat the tip. Data which may be modified or overwritten when providing write current to the write head is preferably read and buffered prior to the write operation, for later re-writing to the disk.

94 Claims, 5 Drawing Sheets

READ ERROR RECOVERY METHOD AND APPARATUS

CROSS-REFERENCE TO RELATED APPLICATIONS

The present application claims the benefit of U.S. Provisional Patent Application Ser. No. 60/377,881, filed May 3, 2002, and cross-reference is made to U.S. patent application Ser. No. 10/337,912, filed Jan. 6, 2003, both of which are incorporated herein by reference in their entirety.

FIELD OF THE INVENTION

The present application is related to a method and apparatus for attempting to recover data from a disk following a read error and, in particular, by heating at least part of an arm tip so as to decrease head-to-disk spacing.

BACKGROUND INFORMATION

Data storage devices including, e.g., those normally provided as part of, or in connection with, a computer or other electronic device, can be of various types. In one general category, data is stored on a fixed or rotating (or otherwise movable) data storage medium and a read head, a write head and/or a read/write head is positioned adjacent desired locations of the medium for writing data thereto or reading data therefrom. One common example of a data storage device of this type is a disk drive (often called a "hard" disk or "fixed" disk drive).

Computer disk drives store information on magnetic disks. Typically, the information is stored on each disk in concentric tracks, divided into sectors. Information is written to and read from a disk by a head (or transducer), which is mounted on an actuator arm capable of moving the head along a (typically arcuate) path to various radial positions over the disk. Accordingly, the movement of the actuator arm allows the head to access different tracks. The disk is rotated by a spindle motor at a high speed, allowing the head to access different sectors on the disk. The head may include separate or integrated read and write elements.

A disk drive 10, exemplary of numerous types of drives that can be used in connection with embodiments of the present invention, is illustrated in FIG. 1. The disk drive comprises a disk 12 that is rotated by a spin motor 14. The spin motor 14 is mounted to a base plate 16. The disk drive 10 also includes an actuator arm assembly 18 having a head 20 (or transducer) mounted to a flexure arm 22, which is attached to an actuator arm 24 that can rotate about a bearing assembly 26 that is attached to the base plate 16. The actuator arm 24 cooperates with a voice coil motor 28 in order to move the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a random access memory (RAM) device. Instead of a one-disk and, therefore, a plurality of corresponding actuator arm assemblies 18.

FIG. 5 is a diagrammatic representation of a simplified top view of a disk 512 having a surface 542 which has been formatted to be used in conjunction with a sectored servo system (also known as an embedded servo system). As illustrated in FIG. 5, the disk 512 includes a plurality of concentric tracks 544a–544h for storing data on the disk's surface 542. Although FIG. 5 only shows a relatively small number of tracks (i.e., 8) for ease of illustration, it should be appreciated that typically tens of thousands of tracks are included on the surface 542 of a disk 512.

Each track 544a–544h is divided into a plurality of data sectors 546 and a plurality of servo sectors 548. The servo sectors 548 in each track are radially aligned with servo sectors 548 in other tracks, thereby forming servo wedges 550 which typically extend radially across the disk 512 (e.g., from the disk's inner diameter 552 to its outer diameter 554).

One of the operations that a disk drive performs is known as a seek operation. During a seek operation, the head 20 is moved from a present track of the disk to a target track of the disk, so that a data transfer can be performed to or from the target track. In order for a seek operation to be performed, a current is delivered to the voice coil motor (VCM) 28 of the disk drive, which causes the actuator arm 24 to rotate, thereby moving the head 20 along an arc intersecting various radial positions relative to the disk surface 542.

With reference now to FIG. 2, a diagrammatic representation of a sectional view of a disk 12 and a head 20 is illustrated. As shown in FIG. 2, during operation, the head 20 (which, as illustrated, includes a slider) is located above disk surface 42 by a spacing 100 known as the flying height of the head 20. The spacing 100 is created by the interaction between air currents above the surface of the disk 12 (also known as an air-bearing) caused by rotation of the disk 12 and the aerodynamic qualities of the slider portion of the head 20.

It is important that the flying height is maintained when the head is flying over portions of the disk surface that contain data. For example, if the head flies at too low a flying height, it is more likely to come into contact with the magnetic disk, which could potentially cause stored data to be lost. As another example, if the head flies too low, a particle resting on the disk surface may become attached to the head, which may cause the aerodynamic characteristics of the head to change. On the other hand, there are advantages to providing a relatively low flying height, especially because low flying heights are better suited for providing relatively small representations of binary digits (bits) and, thus, are associated with high data density. Accordingly, the "nominal" flying height that is employed, for a given disk, during normal operations (i.e. for reading data from the disk and providing it to a computer or other host device, or writing data to the disk, as requested by the host device, so as to substantially avoid data loss or errors), is a compromise between factors that favor low flying height and the risks that are associated with low flying height.

One particular phenomenon which causes low flying heights is known as pole tip protrusion. This phenomenon is described in connection with FIGS. 2, 3 and 4.

FIG. 3 is a simplified, air-bearing surface view of a conventional head 20, which illustrates a write portion 110 of the head and a read portion 120 of the head. For clarity, the slider portion of the head 20 is not shown.

The write portion 110 includes a write pole 130 and a return 135. The read portion includes a magneto-resistive (MR) element 140, along with first and second shields 142, 144. The direction of disk rotation is shown by arrow 150 in FIG. 3, such that the write pole 130 follows the MR read element 140.

FIG. 4 is a simplified, cross-sectional, side view of the conventional head 20 of FIG. 3. In addition to the elements shown in FIG. 3, FIG. 4 illustrates a write coil 155, a write gap 160 and a read gap 165.

As part of the writing process, a (typically variable) current is supplied to the coil 155 to induce magnetic flux across the write gap 160. The direction of the variable current defines the direction in which the magnetic flux will be oriented across the write gap 160. In some simple recording systems, flux polarized in one direction across the write gap 160 will record a binary "one" on the magnetic media while flux polarized in the opposite direction will record a binary "zero." In most recording systems, a change in the direction that the flux travels across the gap 160 is interpreted as a "one" while the lack of a change is interpreted as a "zero." As the disk 12 (shown in FIG. 1) travels under the write portion of the head 20, a series of digital "ones" and "zeros" can be written onto the disk surface 42.

During the read process, the first and second shields 142, 144 define a read gap 165 which serves to focus the flux for a particular magnetic polarity transition onto the read element 140 by shielding the read element 140 from other sources of magnetic flux. In other words, extraneous magnetic flux is filtered away from the read element 140 by the shields 142, 144. The MR read element 140 generates a signal in response to the changing magnetic field, which corresponds to a previously recorded data bit, as magnetic polarity transitions in the magnetic media pass underneath it.

Referring still to FIGS. 2, 3 and 4, the write portion 110 and the read portion 120 of the head 20 are located near the trailing edge of the head 20 (i.e., that portion of the head 20 that is closest to the disk surface 42). More specifically, since the write portion 110 trails the read portion 120 and since the head 20 is pitched (see FIG. 2) relative to the disk surface 42, it is the write portion 110 of the head 20 (specifically, the write pole 130) that is closest to the disk surface 42. In addition, in conventional heads, the write pole 130, return 135, first shield 142, MR element 140 and second shield 144 all have a surface (i.e., their respective surfaces which face the disk surface) which share a common plane 175.

It should be noted that most disk drives store information on disks using longitudinal recording techniques, as opposed to perpendicular recording techniques. However, the configuration of heads associated with longitudinal recording techniques may be very similar to the head shown in FIG. 4, such that its write pole, return, first shield, read element and second shield all lie in the same plane.

Although manufacture, distribution and use of disk drives follow a number of models, in at least some cases, following assembly of a disk drive, one or more testing procedures are performed. Often, testing is provided which is intended to identify, before they are distributed to users, any disk drives which may exhibit performance or reliability issues. In addition to reliability/performance testing, environmental testing may be performed. In some situations, environmental testing includes measuring and/or storing data related to how certain aspects of the disk drive react to various temperatures, pressures or other environmental factors. For example, environmental testing may be used to store information to control the magnitude of write head current as a function of ambient temperature (e.g., since a higher write current may be needed before the disk drive has "warmed up").

Other operations may be performed prior to normal use of the disk drive (i.e. prior to use for reading and/or writing data sent to, or received from, the computer or other host device). In one such operation, the disk is provided with servo information such as sector markers or identifiers and track markers or identifiers. Servo information is generally distinguishable from data, at least, because location information is typically used for purposes of positioning the read/write heads (typically, internally to the disk drive) while data is received from or sent to the computer or other host device. The servo information is typically provided on the disk prior to any normal use of the disk. Further, as a general rule, the location information, once it is provided on the disk, is not, thereafter, altered or erased while, in most disk drives, data can be erased or written-over (although in some applications, some or all portions of disks may be designated as "read-only").

The general trend in data storage, including disk drives, has been for increasingly higher data density on the medium. Higher densities permit not only construction of a physically smaller data storage device, for a given capacity, but also can assist in enhancing performance (reducing seek times, and the like). As will be understood by those skilled in the art, increases in data density are often associated with reductions in the distance between the read/write head and the medium (reduction in "flying height"). Among the technical difficulties encountered when attempting to reduce flying height, are those associated with the pole tip protrusion (PTP) phenomenon. When a write current is introduced into the write coil, the write current causes an amount of heating of the read/write head or arm tip, and the tip thermally expands. Accordingly, the tip is brought even closer to the disk surface 42. This phenomenon is known as pole tip protrusion and must be taken into consideration when designing heads. Failure to accommodate for pole tip protrusion can result in serious consequences, including data loss due to the tip contacting the disk and destroying information stored on the disk surface 42.

Among the parameters which affect the PTP phenomenon are the magnitude of the write current (higher magnitudes are associated with greater PTP), the duration of the write current (greater duration is associated with greater PTP), and the pattern of the write current (a varying pattern is associated with greater PTP, as opposed to, e.g. a D.C. write current).

In general it is a goal of disk drives to reliably read, from a disk, data which has been stored thereon. In the course of normal read operations, it occasionally happens that a read error is detected, i.e., it is determined that an attempt to read data from the disk does not result in a successful read of all target data. A number of conditions can be used to detect the occurrence of a read error including, e.g., the failure of a phase lock loop (PLL) system to achieve a lock condition with respect to a signal which is intended to be the data signal. Without wishing to be bound by any theory, it is believed that any of a number of conditions (or combinations thereof) can be responsible for a read error including, e.g., data being positioned (radially) off-track, data bits which vary, in their longitudinal (track-wise) position from the expected position, and/or ferromagnetic domains or transitions (which are typically used to represent data bits) which have a size or intensity less than the nominal or expected size or intensity.

When a read error occurs, previous approaches have typically included procedures intended to recover some or all of the non-read data. In some cases, data is encoded in a fashion such that if a sufficient portion of a data block is read, it is possible to reconstruct some or all of the data missing from a block. Typically, a system is also provided to attempt reading the data under various altered conditions such as using a "micro-jog" to position the read head incremental and small amounts off-track, relaxing phase lock constraints, varying bias error levels, and the like (or combinations thereof). In some previous devices, normal error recovery included buffering and erasing off-track (e.g., to try to remove coherent noise). Nevertheless, it is not unheard of that such previous, or "normal," read error recovery attempts prove fully or partially unsuccessful.

Accordingly, it would be useful to provide different and/or additional read error recovery techniques for recovering data in response to a read error event. It would be especially useful to provide such different or additional techniques in a fashion which can be readily or inexpensively implemented, such as being capable of implementation with little or no additional modification of hardware, preferably such that the techniques can be implemented substantially by modification of software or firmware, alone (potentially permitting implementation during upgrading or repair of existing units, as well as in new units).

SUMMARY OF THE INVENTION

The present invention includes a recognition and/or appreciation of the existence, nature, and/or source of shortcomings in previous approaches.

In one aspect, the present invention involves responding to the detection of a read error 601 (FIG. 6). Preferably, the present invention is only used during normal read/write operation of the disk drive (e.g., as opposed to initial testing or set-up). The response involves a procedure which can include heating some or all of the arm tip or head so as to decrease the read-head-to-disk distance 602, followed by one or more attempts to read the target data again 603. In one aspect, heating is achieved by a heater operatively coupled to the head or tip. In one embodiment, the write head is used to provide a controllable heat source such as by providing a write current to the write head. The timing of such write current is preferably configured so that the temperature (and resultant thermal expansion) of the tip in the vicinity of the (typically adjacent) read head is still sufficiently elevated, by the time the read head reaches the target data that the PTP phenomenon provides a reduced read-head-to-disk spacing during some or all of the attempted re-read. In at least some embodiments, the heating operation (such as by providing a write current to the write head) can result in modification or destruction of data aligned with the write head. In one embodiment, prior to the heating operation, any valid data in the region that will be affected by the heating operation is first read and stored, so that it can later be re-stored (e.g., rewritten) on the disk drive. Preferably, if some or all of the target data is recovered, such recovered data is re-stored (e.g., rewritten) on the disk drive either in the original location or a different location.

DETAILED DESCRIPTION OF THE PREFERRED EMBODIMENTS

Figure 1:
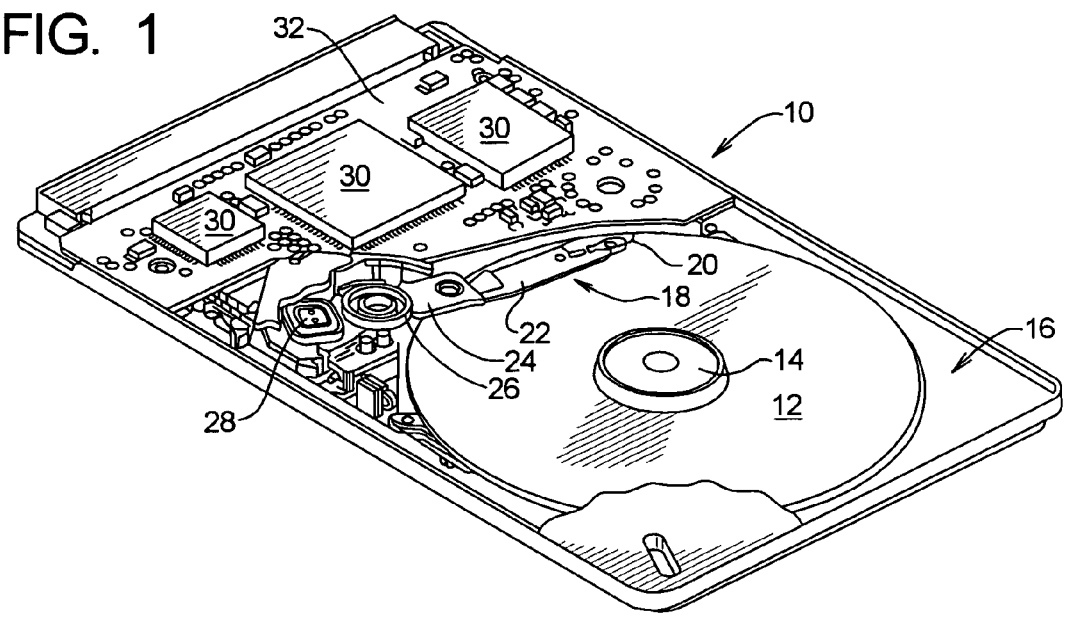
FIG. 1 is a diagrammatic representation of a conventional disk drive.
Figure 2:
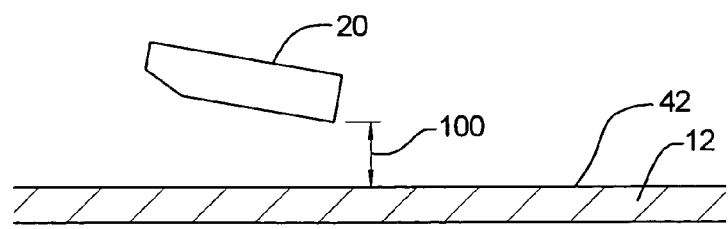
FIG. 2 is a diagrammatic representation of a sectional view of a disk and an associated head, which illustrates the flying height of the head above the disk surface.
Figure 3:
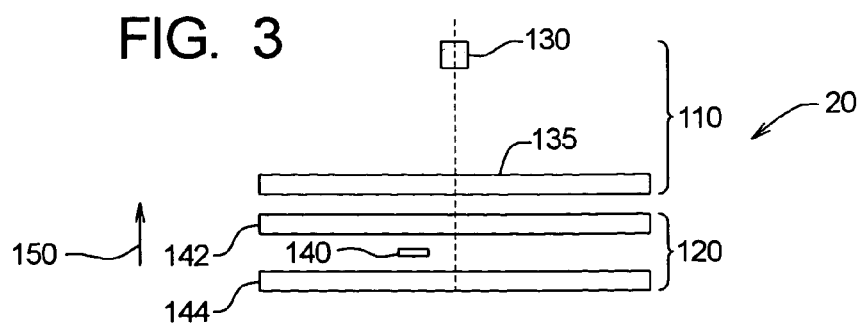
FIG. 3 is a diagrammatic representation of an air-bearing surface view of a conventional head, which illustrates a write portion of the head and a read portion of the head.
Figure 4:
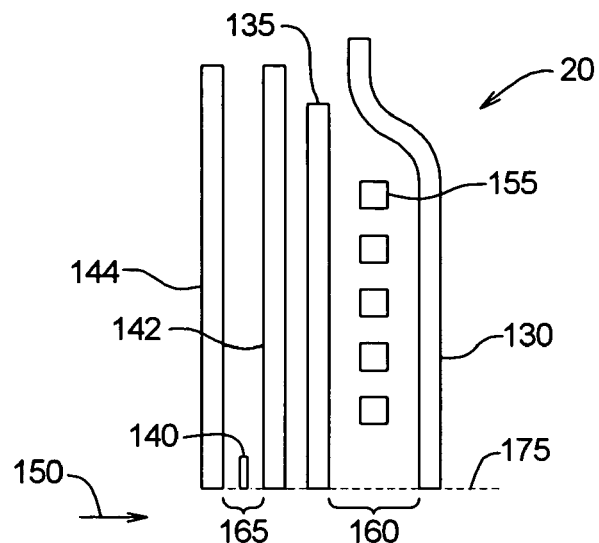
FIG. 4 is a diagrammatic representation of a cross-sectional, side view of the conventional head of FIG. 3.
Figure 5:
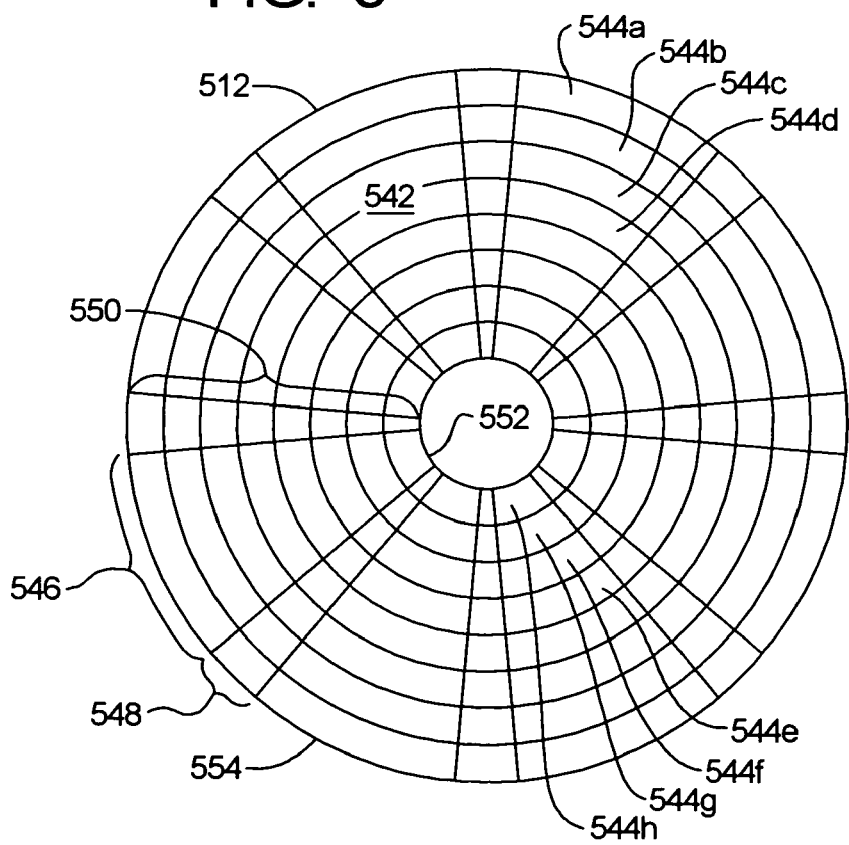
FIG. 5 is a diagrammatic representation illustrating a conventional disk surface that has been formatted to be used in conjunction with a sectored servo system.
Figure 6:
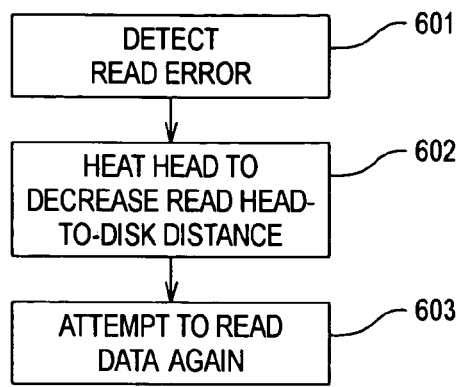
FIG. 6 is a block diagram depicting a process that can be used according to one embodiment of the present invention.
Figure 7:
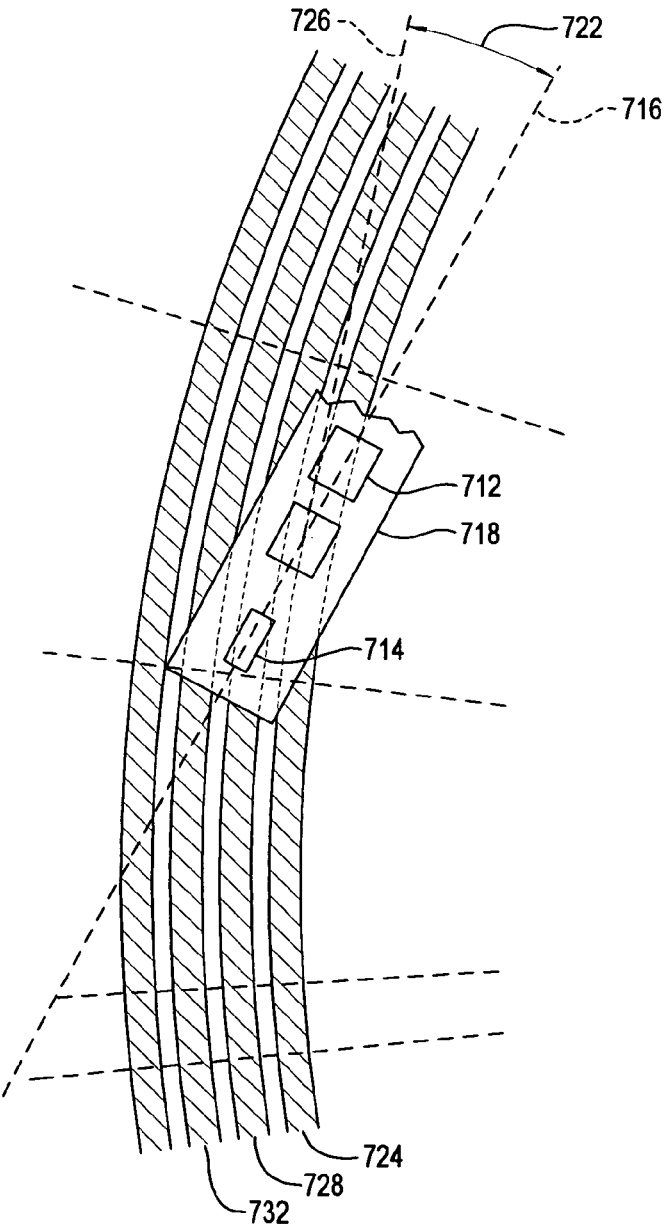
FIG. 7 is a schematic, partial plan view, not to scale, of a portion of a disk and the head tip.

Before describing procedures according the present invention, it is believed useful to note certain features of a read/write head with respect to data tracks of a disk in a typical disk drive. As depicted in FIG. 7, the read head 712 and write head 714 define a line 716 passing through their midpoints, and typically lie along the longitudinal midline of the tip 718. As the actuator arm moves along its arcuate path, the read head-write head line 716 will define various skew angles 722 with respect to the track 724 with which the read head 712 is aligned (or, more precisely with respect to a line 726 tangent to the track 724). Depending on the value of the skew angle (which will vary from track to track), when the read head 712 is aligned with a track 724, the write head 714 may be at a radial position different from the location of the track 724, and thus the write head 714 may be positioned aligned with, or substantially near, a track 728 which is next to the read track 724 or even a track 732 which is two or more tracks from the read track 724.

Figure 8A:
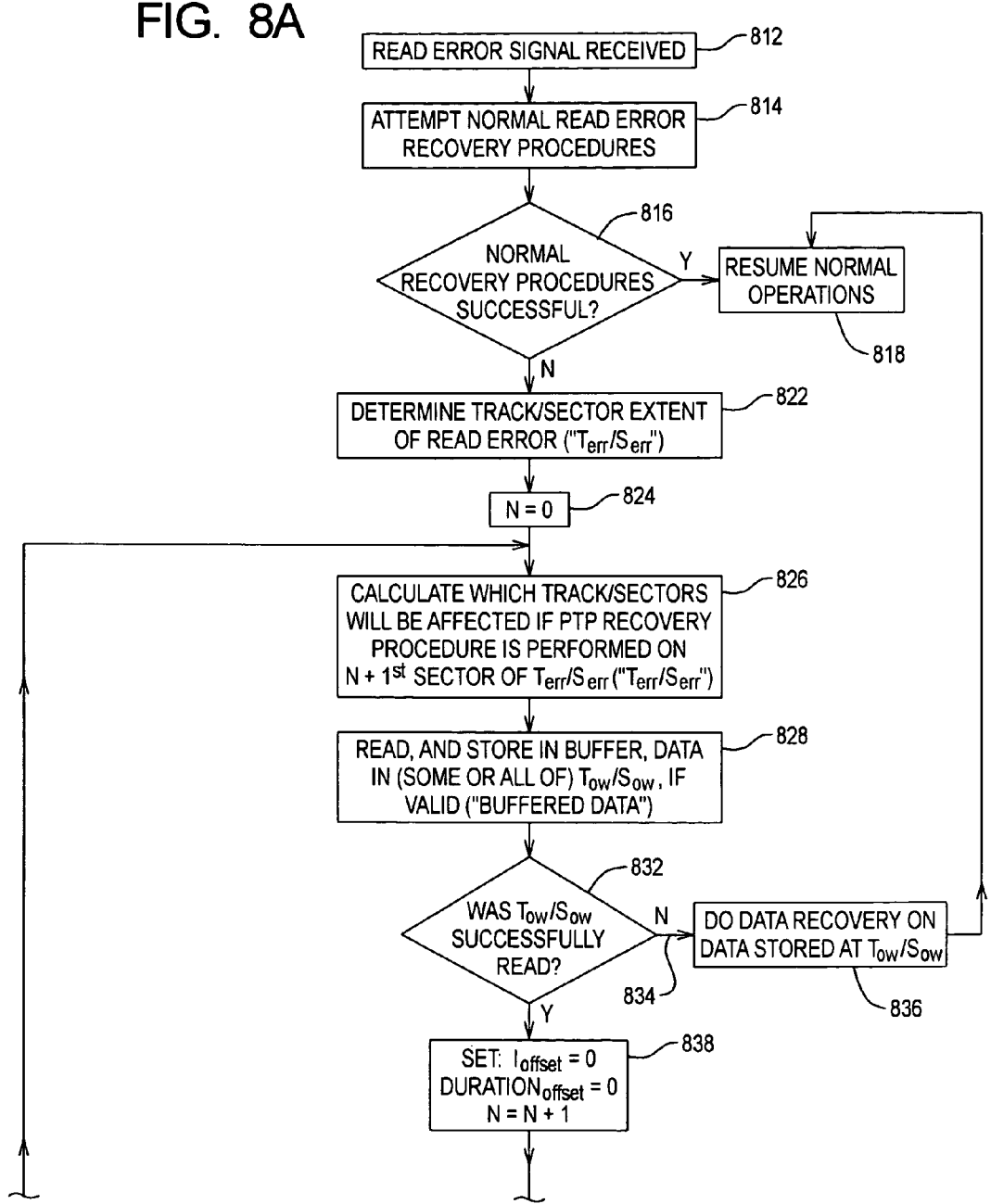
FIGS. 8A and 8B together form a flow chart of a procedure that can be used in accordance with one embodiment of the present invention.
Figure 8B:
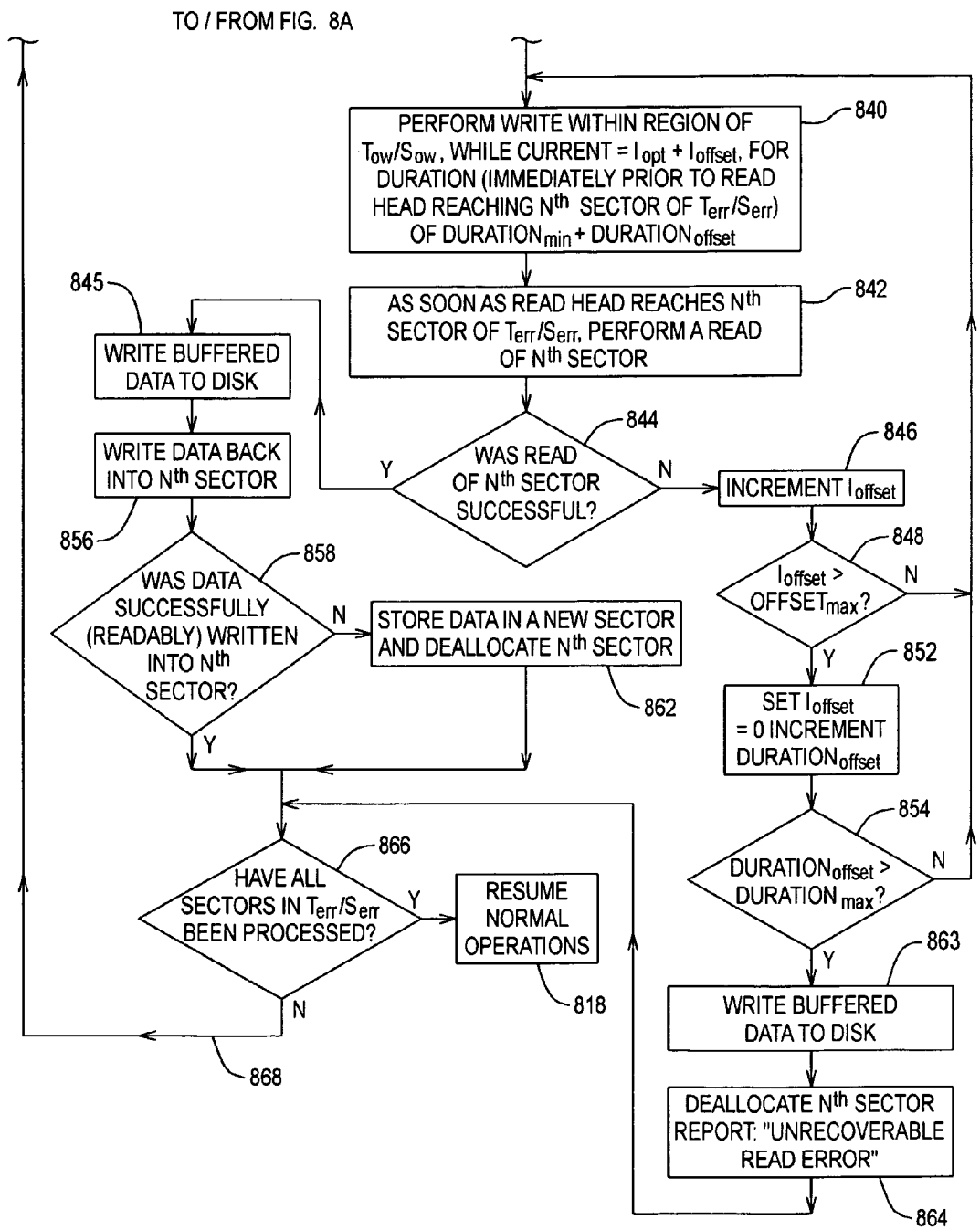

In a typical disk drive many operations and procedures are performed in response to signals or commands issued by a controller which may be, e.g., a microcontroller or microprocessor which operates according to software or firmware. Although it is currently believed that one of the advantages of the present invention is that embodiments of the invention are capable of being implemented substantially only by adding or modifying disk drive firmware or hardware, it is believed there is no technological reason why some or all of the procedures implementing embodiments of the present invention cannot be controlled by hardwired or other hardware-based devices, including application specific integrated circuits (ASICS), programmable logic arrays and the like. Those of skill in the art will understand that descriptions of procedures herein also substantially As depicted in FIGS. 8A and 8B, in response to detection of a read error event, the system may, if desired, be configured to first perform or attempt normal (previously used) read error procedures 814 such as micro-jogging, PLL modification and the like. If such normal error recovery procedures are (preferably fully) successful, the disk drive 816 can resume normal operations 818. Otherwise, other error recovery is attempted. According to the embodiment of FIGS. 8A and 8B, the system preferably first determines the track or sector extent of the read error ("$T_{err}/S_{err}$") 822. Although, in the depicted embodiment, the entire extent of the read error is determined, it is also possible for the system to perform read error detection and/or recovery one unit at a time, such as performing recovery on a first sector of a track where a read error occurs, followed by determining subsequent sectors having occurrences of read errors, if any.

In the embodiment depicted in FIGS. 8A and 8B, the sector counter N is initialized to zero 824. The system then calculates which tracks and sectors will be affected if a PTP recovery procedure is performed on some or all of the $T_{err}/S_{err}$. As discussed above in connection with FIG. 7, depending on the skew angle 722 when the read head 712 is aligned with a first track 724, the write head 714 may be aligned with, or substantially close to, one or more different tracks 728. Accordingly, if an embodiment is used which involves providing write current to the write head before the re-read attempt is made, the data which may be destroyed or otherwise affected by the write head may include data which is not only longitudinally (track-wise) different from the target data but may also be on a different track from the track of the target data. Accordingly, in order to save or buffer such data before it is destroyed, it is necessary to know which data will be affected. In the embodiment of FIGS. 8A and 8B, the tracks or sectors that will be affected or overwritten are designated by $T_{ow}/S_{ow}$. As will be understood by those of skill in the art, $T_{ow}/S_{ow}$ can be calculated from a knowledge of the skew angle (for the read track) and the duration of the write current. In some embodiments, some or all calculations may be performed in advance and determination of $T_{ow}/S_{ow}$ may include retrieving values from a look-up table. In some embodiments, $T_{ow}/S_{ow}$ is calculated based on performing recovery on one sector at a time, particularly performing recovery on the $N+1^{st}$ sector of $T_{err}/S_{err}$. If, in another embodiment, recovery is to be performed on more than one sector at a time, this will have to be taken into account when calculating the tracks or sectors that will be affected.

Once the tracks or sectors that will be affected have been calculated, the data in some of or, preferably, all of $T_{ow}/S_{ow}$ is read and stored for later use as described below. This data will be referred to herein as "buffered data." The number of sectors to be read, in one embodiment, is as large as possible, e.g., up to a full revolution of the disk, constrained by the buffer size or other time or code requirements. Of course, it is possible that some or all of the affected tracks and sectors $T_{ow}/S_{ow}$ will not contain data or will not contain valid data. Accordingly, in some embodiments, it may be desired to buffer only the valid data (if any) from the $T_{ow}/S_{ow}$ region 828. Preferably, it is determined whether the read of (valid, if any) data from $T_{ow}/S_{ow}$ was successfully read 832. If not, this system preferably loops 834 so as to do data recovery on the data at $T_{ow}/S_{ow}$ 836.

In the embodiment of FIGS. 8A and B, current magnitude offset parameter ($I_{offset}$) is set equal to zero and write current Duration offset parameter ($Duration_{offset}$) is also set equal to zero, and the sector counter N is incremented 838. The system then performs a write operation within the $T_{ow}/S_{ow}$ region. During such write operation, the write current is set equal to $I_{opt}+I_{offset}$ where $I_{opt}$ is the (preferably pre-stored) optimal write current for this portion of the disk.

In one embodiment, the reduced fly height read is performed at a read-head-to-disk distance of about 0.9 microinches or less. The write operation is conducted for a duration equal to a minimum read error recovery duration ($Duration_{min}$) plus $Duration_{offset}$. In at least some contemplated embodiments, the duration is initially set at a value equal to the time required for the head to traverse about 3 to 20 data sectors, preferably about 5 data sectors. The duration of the write operation may be constrained by the number of sectors that can be efficiently buffered, bearing in mind that $T_{ow}/S_{ow}$ may include more than one track (e.g., if the write head is positioned substantially between two tracks and may affect both tracks during the write operation). It is believed that a duration as low as 50 microseconds may be sufficient to provide at least some lower fly height benefit. The write operation is initiated at a time such that, at the end of the calculated duration, the read head will be at (or just before) the $N^{th}$ sector of $T_{err}/S_{err}$ 840. Preferably, write current is provided to the write head in a pattern such as data pattern of 1's and 0's. It is believed that greater heating of the tip is achieved using write current provided in such a pattern. In one embodiment, when the write head is positioned (or can be positioned) substantially centered on a data track during the write operation, the write current can be provided in a pattern designed to re-write the "buffered" data onto all or a portion of $T_{ow}/S_{ow}$. In one embodiment, e.g., in order to provide for additional variability and control in the amount of heating achieved, write current is initially provided as DC current and a pattern write current is only used if previous re-read attempts are unsuccessful. In general, it is preferred to provide little or no time gap between the end of the write operation and the beginning of the re-read operation, in order to avoid undesired cooling of the tip (and, thus, undesired increase of the read-head-to-disk spacing) before the read operation begins. However, in some situations, some amount of delay may be provided. For example, if the $N^{th}$ sector occurs immediately after a servo sector, it is necessary to terminate the write current prior to the write head reaching the servo sector (lest the write operation overwrite servo information). In most disk drives, this will not present a substantial problem since it is believed it will require approximately 0.5 to 1.0 milliseconds (for at least or some current disk drive configurations) for the tip to cool to its substantially steady state (not heated by write current) temperature whereas, in many current disk drives, the head will traverse a servo sector in about 25 microseconds. The head will traverse a data sector, in many typical configurations, in about 100 microseconds. After completion of the write operation, and as soon as the read head reaches the $N^{th}$ sector of the $T_{err}/S_{err}$, the system performs a re-read of the $N^{th}$ sector 842. It is then determined whether such re-read was successful 844. If not, various further re-read attempts can be made. In the embodiment of FIGS. 8A and 8B, various combinations of write current magnitude and write current duration are used 846, 848, 852, 854 and additional heating and re-reading 840, 842 is attempted.

If, at any point, a successful read of the sector is performed 844, the data which was read is written back into the disk drive, in the embodiment of FIGS. 8A and 8B, back into the $N^{th}$ sector 856 and the buffered data is written back in the original location (unless written during the heating process). This data is then read to determine whether it was successfully (readably) written into the $N^{th}$ sector 858. If not, the data is stored in a sector different from the $N^{th}$ sector and the $N^{th}$ sector of the disk is de-allocated 862 so that is no longer used during normal read/write operations. If the read of the sector was successful 844, or if all attempts to re-read the sector have been unsuccessful (in which case, the buffered data is written back to its original location, 863; the $N^{th}$ sector is de-allocated and, "unrecoverable read error" is reported) 864, then it is determined whether all sectors in $T_{err}/S_{err}$ have been processed 866. If not, the process loops 868 to perform the described error recovery on the next sector. Or, if all sectors have processed, normal operations are resumed 818.

Although embodiments have been described in which a single sector at a time is re-read (after heating the tip), it is also possible to read two or more sectors for each re-heating of the tip.

Although embodiments have been described herein using the write head as a heater, it is also possible to provide other types of heating including resistive heating, radiative heating, laser heating, and the like. In general, if the write head is not used as a heater, there will be no destruction or overwriting of adjacent data and, accordingly, reading and storing buffered data may not be necessary, which may substantially improve performance, since data buffering represents a significant amount of the total time requirement for procedures according the embodiments of the present invention.

In light of the above description, a number of advantages of the present invention can be seen. The present invention can provide for reading, following a read error, of at least some data, including data which may be unreadable by normal (previous) read error recovery procedures. The present invention can also provide for significantly higher probability of recovering marginal data which may be unrecoverable by normal read error recovery procedures. Embodiments of the present invention include read error recovery implemented with little or no hardware modification (in at least some disk drives) preferably implemented substantially only by changes in software or firmware. By permitting recovery of data not recoverable by previous normal procedures, the present invention may avoid the need to deallocate disk sectors thus providing, on average, higher effective (useful) capacity.

A number of variations and modifications of the present invention can be used. It is possible to use some features of the invention without using others. For example, it is possible to provide for heating the tip without using a write head as a heat source. Although it is contemplated that the present invention will be especially useful in connection with MR heads using longitudinal recording, there is no known technological reason why the present invention can not be used in connection with at least some other types of heads or recording, now known or hereafter developed. Those of skill in the art will understand that a programmed microprocessor or other device can be considered a form of "circuitry" at least in the sense that execution of programs can be viewed as resulting in the opening and closing of (typically transistor) switches and thus effectively changing circuitry as a program executes. Although the present invention has been described in the context of disk drives using magneto-resistive (MR) or giant magneto-resistive (GMR) technologies for the heads, some or all aspects of the present invention can be used in connection with other types of heads. Although the present invention has been described to include performing normal read recovery procedures before attempting (if necessary) the described PTP read error recovery procedures, it is possible to use PTP error recovery procedures without first using normal read error recovery procedures. However, it is believed that in general, the described PTP error recovery procedures may be more time-consumptive than normal error recovery procedures; and, accordingly, is generally preferred to attempt normal (fast) read error recovery procedures first.

The present invention, in various embodiments, includes components, methods, processes, systems and/or apparatus substantially as depicted and described herein, including various embodiments, sub-combinations, and subsets thereof. Those with skill in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including ultimate, interchangeable and/or equivalent structures, functions, ranges or steps to those claimed, whether or not such ultimate, interchangeable and/or equivalent structures, functions, ranges or steps are disclosed herein, and without intending to publicly dedicate any patentable subject matter.

What is claimed is:

1. A disk drive apparatus, comprising:
    at least a first rotatable disk having data stored thereon in a plurality of tracks and sectors;
    at least a first arm, having a tip with a read head, positionable adjacent selectable locations of said disk and defining, at any given time, a head-to-disk spacing between said read head and said disk; and
    circuitry configured to detect a read error with respect to target data, and, in response, to heat said tip so as to cause a decrease in said head-to-disk spacing during at least a first re-read of at least some of said target data.

2. Apparatus as claimed in claim 1 wherein said circuitry includes a processor controlled by a program.

3. Apparatus as claimed in claim 2 wherein said program comprises software.

4. Apparatus as claimed in claim 2 wherein said program comprises firmware.

5. Apparatus as claimed in claim 1 wherein said circuitry only heats said tip if a previous normal read-error-recovery procedure is not entirely successful.

6. Apparatus, as claimed in claim 1, wherein said disk drive substantially uses a nominal head-to-disk spacing during normal read operations and wherein the actual head-to-disk spacing during at least part of said re-read is less than said nominal head-to-disk spacing.

7. Apparatus, as claimed in claim 1, further comprising circuitry configured to heat said tip, at least in part, by activating a heater operatively coupled to said tip.

8. Apparatus, as claimed in claim 7, wherein said heater comprises an electrical resistance heater.

9. Apparatus, as claimed in claim 1 wherein said tip further includes a write head and further comprising circuitry configured to heat said tip, at least in part, by providing a current to said write head.

10. Apparatus, as claimed in claim 9, wherein said read head comprises a magneto-resistive (MR) head.

11. Apparatus, as claimed in claim 9, further comprising circuitry configured to determine whether there is valid data in at least a first disk portion substantially adjacent to the position of at least part of said target data, prior to heating said tip.

12. Apparatus, as claimed in claim 9, further comprising circuitry configured to read, and recoverably store, data in at least a first disk portion substantially adjacent to the position of at least part of said target data, prior to heating said tip.

13. Apparatus, as claimed in claim 12 wherein said first disk portion includes data on a track different from a track where said target data is stored.

14. Apparatus, as claimed in claim 12 wherein said first disk portion includes data on a sector different from a sector where said target data is stored.

15. Apparatus as claimed in claim 12 further comprising circuitry configured to recoverably store said data in electronic memory.

16. Apparatus, as claimed in claim 12, further comprising circuitry configured to recoverably store said data on said disk drive.

17. Apparatus as claimed in claim 1 wherein said at least some of said target data comprises data from one sector of one track of said disk.

18. Apparatus as claimed in claim 9 further comprising circuitry configured to determine whether some or all of said target data was read during said re-read.

19. Apparatus, as claimed in claim 18, wherein said current provided to said write head during said first re-read is an initial re-read write current, and further comprising circuitry configured to perform at least a second re-read of at least some of said target data using a write current greater than said initial re-read write current.

20. Apparatus, as claimed in claim 18, wherein said current provided to said write head during said first re-read is provided for an initial duration, and further comprising circuitry configured to perform at least a second re-read of at least some of said target data using a write current duration greater than said initial duration.

21. Apparatus, as claimed in claim 9 further comprising circuitry configured to re-store at least some of said target data which is read by said initial re-read, if any, following said re-read.

22. Apparatus, as claimed in claim 21 wherein at least some of said target data, if any, is re-stored at a location different from the position of said target data.

23. Apparatus, as claimed in claim 21 wherein at least some of said target data, if any, is re-stored at the location of said target data, and further comprising circuitry configured to determine whether said re-stored data is readable by normal read operations.

24. Apparatus, as claimed in claim 23, further comprising circuitry configured to store at least some of said target data at a location different from the position of said target data, if said re-stored data is not readable by normal read operations.

25. Apparatus, as claimed in claim 23, further comprising circuitry configured to deallocate the position of said target data, if said re-stored data is not readable by normal read operations.

26. Apparatus as claimed in claim 12 further comprising circuitry configured to store, on said disk drive, said recoverably stored data.

27. Apparatus, as claimed in claim 12 further comprising circuitry configured to store, in said first disk portion, said recoverably stored data.

28. A method, usable in connection with a disk drive, comprising:
providing at least a first rotatable disk having data stored thereon in a plurality of tracks and sectors;
providing at least a first arm, having a tip with a read head, positionable adjacent selectable locations of said disk and defining, at any given time, a head-to-disk spacing between said read head and said disk;
detecting a read error with respect to target data;
in response to said detecting, heating said tip so as to cause a decrease in said head-to-disk spacing; and
performing at least a first re-read of at least some of said target data during said decrease in said head-to-disk spacing caused by said heating.

29. A method as claimed in claim 28 wherein said heating is performed only if a previous normal read-error-recovery procedure is not entirely successful.

30. A method, as claimed in claim 28, wherein said disk drive substantially uses a nominal head-to-disk spacing during normal read operations and wherein the actual head-to-disk spacing during at least part of said re-read is less than said nominal head-to-disk spacing.

31. A method, as claimed in claim 28, further comprising heating said tip, at least in part, by activating a heater operatively coupled to said tip.

32. A method, as claimed in claim 31, wherein said heater comprises an electrical resistance heater.

33. A method, as claimed in claim 28 wherein said tip further includes a write head and further comprising heating said tip, at least in part, by providing a current to said write head.

34. A method, as claimed in claim 33, further comprising determining whether there is valid data in at least a first disk portion substantially adjacent to the position of at least part of said target data, prior to heating said tip.

35. A method, as claimed in claim 33, further comprising reading, and recoverably storing, data in at least a first disk portion substantially adjacent to the position of at least part of said target data, prior to heating said tip.

36. A method, as claimed in claim 35 wherein said first disk portion includes data on a track different from a track where said target data is stored.

37. A method, as claimed in claim 35 wherein said first disk portion includes data on a sector different from a sector where said target data is stored.

38. A method as claimed in claim 35 further comprising recoverably storing said data in electronic memory.

39. A method, as claimed in claim 35, further comprising recoverably storing said data on said disk drive.

40. A method, as claimed in claim 28 wherein said at least some of said target data comprises data from one sector of one track of said disk.

41. A method as claimed in claim 33 further comprising determining whether some or all of said target data was read during said re-read.

42. A method, as claimed in claim 41, wherein said current provided to said write head during said first re-read is an initial re-read write current, and further comprising performing at least a second re-read of at least some of said target data using a write current greater than said initial re-read write current.

43. A method, as claimed in claim 41, wherein said current provided to said write head during said first re-read is provided for an initial duration, and further comprising performing at least a second re-read of at least some of said target data using a write current duration greater than said initial duration.

44. A method, as claimed in claim 33 further comprising re-storing at least some of said target data which is read by said initial re-read, if any, following said re-read.

45. A method, as claimed in claim 44 wherein at least some of said target data, if any, is re-stored at a location different from the position of said target data.

46. A method, as claimed in claim 44 wherein at least some of said target data, if any, is re-stored at the location of said target data, and further comprising determining whether said re-stored data is readable by normal read operations.

47. A method, as claimed in claim 46, further comprising storing at least some of said target data at a location different from the position of said target data, if said re-stored data is not readable by normal read operations.

48. A method, as claimed in claim 46, further comprising deallocating the position of said target data, if said re-stored data is not readable by normal read operations.

49. A method, as claimed in claim 35 further comprising storing, on said disk drive, said recoverably stored data.

50. A method, as claimed in claim 35 further comprising storing, in said first disk portion, said recoverably stored data.

51. A method, as claimed in claim 33, wherein said step of providing a current comprises providing a substantially D.C. current.

52. A method, as claimed in claim 33, wherein said step of providing a current comprises providing a non-D.C. current.

53. A method, as claimed in claim 33 wherein said step of providing a current comprises writing data.

54. A method, as claimed in claim 33 wherein said step of providing a current comprises writing said recoverably stored data.

55. A method of operating a disk drive that includes a head and a disk, the method comprising:
 detecting a read error in target data read from the disk using the head at a nominal flying height;
 heating the head in response to the read error, thereby decreasing the flying height of the head due to thermal expansion of the head; and
 re-reading the target data from the disk using the head at a decreased flying height due to the heating.

56. A method, as claimed in claim 55, including heating the head by resistive heating.

57. A method, as claimed in claim 55, including heating the head by radiative heating.

58. A method, as claimed in claim 55, including heating the head by laser heating.

59. A method, as claimed in claim 55, including heating the head by applying a write current to the head.

60. A method, as claimed in claim 59, including terminating the write current before re-reading the target data.

61. A method, as claimed in claim 59, including terminating the write current before the head reads from a servo sector and then re-reading the target data from a data sector that occurs immediately after the servo sector using the head at the decreased flying height.

62. A method, as claimed in claim 59, wherein the write current causes the head to overwrite data on a portion of the disk.

63. A method, as claimed in claim 62, including:
 determining the portion of the disk;
 reading data from the portion of the disk using the head at the nominal flying height;
 storing the data from the portion of the disk in a buffer; then
 heating the head by applying the write current to the head, thereby overwriting the data on the portion of the disk; and then
 writing the data from the portion of the disk to the disk using the head at the nominal flying height.

64. A method, as claimed in claim 63, wherein determining the portion of the disk includes using a skew angle of the head relative to a track that contains the target data.

65. A method, as claimed in claim 63, wherein determining the portion of the disk includes using a duration of the write current.

66. A method, as claimed in claim 55, including reading and writing data to and from the disk using the head at the nominal flying height during normal read and write operations.

67. A method, as claimed in claim 55, including:
 re-reading the target data from the disk using the head at the nominal flying height in response to the read error;
 performing an error recovery procedure on the target data; and
 heating the head and re-reading the target data from the disk using the head at the decreased flying height if the error recovery procedure is unsuccessful.

68. A method, as claimed in claim 67, wherein the error recovery procedure includes micro-jogging.

69. A method, as claimed in claim 67, wherein the error recovery procedure includes phase lock loop modification.

70. A method, as claimed in claim 55, including:
 detecting a second read error in the target data read from the disk using the head at the decreased flying height;
 heating the head in response to the second read error more than in response to the read error, thereby decreasing the flying height of the head in response to the second read error more than in response to the read error; and
 re-reading the target data from the disk using the head at a second decreased flying height due to the heating in response to the second read error, wherein the second decreased flying height is smaller than the decreased flying height.

71. A method, as claimed in claim 70, including:
 heating the head in response to the read error by applying a first write current to the head; and
 heating the head in response to the second read error by applying a second write current to the head, wherein the second write current has greater magnitude than the first write current.

72. A method, as claimed in claim 70, including:
 heating the head in response to the read error by applying a first write current to the head; and
 heating the head in response to the second read error by applying a second write current to the head, wherein the second write current has greater duration than the first write current.

73. A method, as claimed in claim 70, including:
 heating the head in response to the read error by applying a first write current to the head; and
 heating the head in response to the second read error by applying a second write current to the head, wherein the first write current is direct current and the second write current is alternating current.

74. A method, as claimed in claim 55, wherein re-reading the target data from the disk using the head at the decreased flying height provides significantly higher probability of recovering the target data than re-reading the target data from the disk using the head at the nominal flying height.

75. A method of operating a disk drive that includes a head and a disk, the method comprising:
 reading data from and writing data to the disk using the head at a nominal flying height during normal read and write operations;
 detecting a read error in target data read from the disk using the head at the nominal flying height;
 applying a write current to the head in response to the read error, thereby heating the head and decreasing the flying height of the head due to thermal expansion of the head; and
 re-reading the target data from the disk using the head at a decreased flying height due to the heating.

76. A method, as claimed in claim 75, including terminating the write current before re-reading the target data.

77. A method, as claimed in claim 75, wherein the write current causes the head to overwrite data on a portion of the disk.

78. A method, as claimed in claim 77, including:
determining the portion of the disk;
reading data from the portion of the disk using the head at the nominal flying height;
storing the data from the portion of the disk in a buffer; then
heating the head by applying the write current to the head, thereby overwriting the data on the portion of the disk; and then writing the data from the portion of the disk to the disk using the head at the nominal flying height.

79. A method, as claimed in claim 78, wherein determining the portion of the disk includes using a skew angle of the head relative to a track that contains the target data.

80. A method, as claimed in claim 78, wherein determining the portion of the disk includes using a duration of the write current.

81. A method, as claimed in claim 78, including:
re-reading the target data from the disk using the head at the nominal flying height in response to the read error;
performing an error recovery procedure on the target data; and
heating the head and re-reading the target data from the disk using the head at the decreased flying height if the error recovery procedure is unsuccessful.

82. A method, as claimed in claim 75, including:
detecting a second read error in the target data read from the disk using the head at the decreased flying height;
applying a second write current to the head in response to the second read error, thereby heating the head and decreasing the flying height of the head due to thermal expansion of the head in response to the second read error more than in response to the read error; and
re-reading the target data from the disk using the head at a second decreased flying height due to the heating in response to the second read error, wherein the second decreased flying height is smaller than the decreased flying height.

83. A method, as claimed in claim 82, wherein the second write current has greater magnitude than the write current.

84. A method, as claimed in claim 82, wherein the second write current has greater duration than the write current.

85. A method, as claimed in claim 82, wherein the write current is direct current and the second write current is alternating current.

86. A method, as claimed in claim 75, wherein re-reading the target data from the disk using the head at the decreased flying height provides significantly higher probability of recovering the target data than re-reading the target data from the disk using the head at the nominal flying height.

87. A method of operating a disk drive that includes a head and a disk, the method comprising:
reading data from and writing data to the disk using the head at a nominal flying height during normal read and write operations;
detecting a read error in target data read from the disk using the head at the nominal flying height;
determining a portion of the disk in response to the read error;
reading data from the portion of the disk using the head at the nominal flying height;
storing the data from the portion of the disk in a buffer; then
applying a write current to the head in response to the read error, thereby heating the head and decreasing the flying height of the head due to thermal expansion of the head and overwriting the data on the portion of the disk; then
re-reading the target data from the disk using the head at a decreased flying height due to the heating, thereby providing a significantly higher probability of recovering the target data than re-reading the target data from the disk using the head at the nominal flying height; and
writing the data from the portion of the disk to the disk using the head at the nominal flying height.

88. A method, as claimed in claim 87, wherein determining the portion of the disk includes using a skew angle of the head relative to a track that contains the target data and using a duration of the write current.

89. A method, as claimed in claim 87, including terminating the write current before re-reading the target data.

90. A method, as claimed in claim 87, including terminating the write current before the head reads from a servo sector and then re-reading the target data from a data sector that occurs immediately after the servo sector using the head at the decreased flying height.

91. A method, as claimed in claim 87, including:
re-reading the target data from the disk using the head at the nominal flying height in response to the read error;
performing an error recovery procedure on the target data; and
heating the head and re-reading the target data from the disk using the head at the decreased flying height if the error recovery procedure is unsuccessful.

92. A method, as claimed in claim 87, including:
detecting a second read error in the target data read from the disk using the head at the decreased flying height;
applying a second write current to the head in response to the second read error, thereby heating the head and decreasing the flying height of the head due to thermal expansion of the head in response to the second read error more than in response to the read error; and
re-reading the target data from the disk using the head at a second decreased flying height due to the heating in response to the second read error, wherein the second decreased flying height is smaller than the decreased flying height.

93. A method, as claimed in claim 92, wherein the second write current has greater magnitude and/or greater duration than the write current.

94. A method, as claimed in claim 92, wherein the write current is direct current and the second write current is alternating current.

* * * * *